COLOR HUE ERROR CORRECTION APPARATUS
Filed Nov. 15, 1967
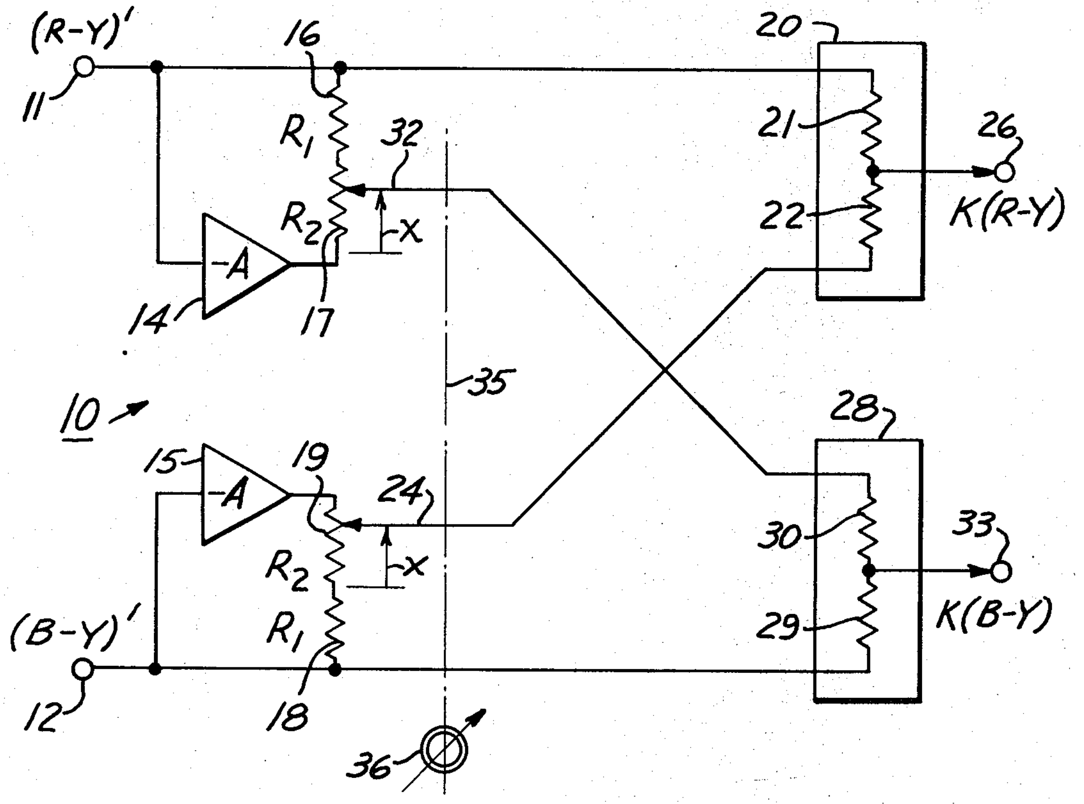
INVENTOR.
NORTON W. BELL
BY Raymond A. Andrews
ATTORNEY.

United States Patent Office 3,536,827
Patented Oct. 27, 1970

3,536,827

COLOR HUE ERROR CORRECTION APPARATUS

Norton W. Bell, Pasadena, Calif., assignor to Bell & Howell Company, Chicago, Ill., a corporation of Illinois Filed Nov. 15, 1967, Ser. No. 683,248
Int. Cl. H04n 9/50
U.S. Cl. 178—5.4 7 Claims

ABSTRACT OF THE DISCLOSURE

An apparatus for adjusting the hue intelligence of two electric chroma signals includes circuitry for producing a first control signal having substantially a value of $S_1 \tan \Delta_{max}(2x-1)$ and a second control signal having substantially a value of $S_2 \tan \Delta_{max}(1-2x)$, wherein $S_1$ is the amplitude of a first chroma signal, $S_2$ is the amplitude of a second chroma signal of the two chroma signals, $\Delta_{max}$ represents an excursion of an angular hue error, and $x$ is a scalar adjustable from zero to one. The apparatus also includes circuitry for combining the first control signal with the second chroma signal and the second control signal with the first chroma signal whereby hue values in the two chroma signals are adjustable by variation of the $x$ scalar.

CROSS-REFERENCE TO RELATED APPLICATION

The present application contains subject matter related to my copending patent application Ser. No. 634,556, Video Recorder for Color, filed Apr. 28, 1967, and assigned to the present assignee.

BACKGROUND OF THE INVENTION

Field of the invention

The present invention relates to color video apparatus and, more particularly, to apparatus for effecting color hue adjustments in color video equipment.

Description of the prior art

In a color television system operating under the NTSC standard, two chroma signals modulate a common color subcarrier in quadrature, with color hue information being expressed by phase angle modulation and color saturation information by amplitude modulation. At the receiver, the color information or a suitable approximation thereof is reconstructed by means of a process which involves a demodulation of two chroma signals by means of a locally generated reference signal which oscillates at the frequency of the above mentioned color subcarrier.

In practice several situations may arise which require a modification of the received color hue information before the demodulated and matrixed color signals are applied to the color display device. For instance imperfections in the transmission or other processing phases of the chroma signal may require hue adjustments on the part of the viewer. Quite apart from imperfections, such adjustments may be dictated by individual viewing preferences, by prevailing light conditions at the viewing location, by particular color reproduction characteristics of the color display device, or by any combination of these or similar factors.

In the case of conventional color television reception, reasonably satisfactory hue adjustments are readily made possible by providing a control which permits adjustments of the phase of the above mentioned local reference signal. These adjustments affect the phase demodulation process of the chroma signals and thus modify the hue information content of these signals.

The feasibility of the type of control just described is of course conditioned on the availability of the local reference signal at the time the hue adjustments are to be effected. That this condition is not always met in practice is seen from my aforesaid copending patent application in which the above mentioned color signal demodulation process takes place prior to a recording of the color signals along with the luminance and synchronization information. In this type of case, hue adjustments upon playback of the recording cannot be effected by a variation of the mentioned local reference signal.

SUMMARY OF THE INVENTION

The subject invention overcomes the latter disadvantage by providing apparatus for permitting hue adjustments without resort to the local reference signal used for chroma signal demodulation purposes.

From one aspect thereof, the invention provides apparatus comprising means connected to receive a first one of two chroma signals for producing a first control signal having a value of $$S_1 \tan \Delta_{max}(2x-1)$$

wherein $S_1$ is the amplitude of the first chroma signal, $\Delta_{max}$ is a predetermined angle, such as the maximum excursion of an angular hue error contained in the chroma signals, and $x$ is a scalar adjustable from 0 to 1.

The apparatus under consideration further includes means connected to receive the second one of said chroma signals for producing a second control signal having a value of $$S_2 \tan \Delta_{max}(1-2x)$$

wherein $S_2$ is the amplitude of the second chroma signal, $\Delta_{max}$ is substantially the above mentioned predetermined angle, and $x$ is a scalar adjustable from 0 to 1.

The apparatus further includes means for combining the first chroma signal and the second control signal, and means for combining the second chroma signal and the first control signal.

As the subject description proceeds, it will be recognized that apparatus of the type just described are capable of correcting hue errors or of otherwise adjusting hue intelligence of electric chroma signals in a novel and highly effective manner.

BRIEF DESCRIPTION OF THE DRAWINGS

The invention and features and objectives thereof may be more readily understood from the following detailed description of preferred embodiments of the invention, illustrated by way of example in the accompanying drawing in which the single figure is a schematic of a hue error correction apparatus in accordance with a preferred embodiment of the subject invention.

DESCRIPTION OF PREFERRED EMBODIMENTS

The hue control apparatus shown in the drawing is suitable for use in the color recording and palyback system disclosed in my above mentioned copending patent application.

Briefly, in a preferred embodiment of that system the luminance and sync signal information (customarily symbolized by $(Y+S)$ or (succinctly, Y) is extracted from a composite color video signal, is modulated to be suitable for recording, and is recorded on magnetic tape by means of a recording head. The chrominance information is demodulated in a conventional fashion with the assitance of a local reference signal oscillating at the color subcarrier frequency and phase to provide two color-difference signals $R-Y$ (red minus luminance) and $B-Y$ (blue minus luminance). These color-difference signals are thereafter individually time modulated to be suitable for recording, and are thereupon recorded on magnetic tape in two different recording channels by means of recording heads.

Upon playback, the Y, $R-Y$ and $B-Y$ signals are individually demodulated and the color information is reconstructed for display by a conventional matrixing technique.

In such a system, hue adjustments in the chroma signals upon playback cannot be effected by an adjustment of the above mentioned local reference signal, since that signal, which is used for the color demodulation process prior to recording, is no longer available upon playback and the signals are no longer in suitable form.

For the purpose of the present discussion it is assumed that a situation exists in which the phase of the local reference signal during the recording process was misadjusted by an error of $\Delta$ radians. In practice such a situation occurs for example if the apparatus used for receiving the composite video signal is equipped with the type of prior-art hue control mentioned above, and if this control is not properly adjusted during the recording operation.

Accordingly the local reference signal can be written as $$C=\cos\ (\omega_s t+\Delta) \qquad (1)$$

wherein C is the instantaneous value of the local reference signal, $\omega_s$ is its angular frequency, and $\Delta$ the above mentioned phase error.

To determine the effect of this error on the demodulated color-difference signals $R-Y$ and $B-Y$, the modulated chroma signal which is applied to the chroma demodulators may be written as $$S=(R-Y)\cos \omega_s t+(B-Y)\cos\left(\omega_s t-\frac{\pi}{2}\right) \qquad (2)$$

wherein S is the amplitude of the chroma signal just mentioned, $\omega_s$ is the angular frequency of its subcarrier, $(R-Y)$ and $(B-Y)$ are the amplitudes of the two color-difference signals contained in the chroma signals S, and $-\pi/2$ indicates that the $(B-Y)$ component is modulated in quadrature to the $(R-Y)$ component, as is the case in conventional systems operating under the NTSC color standard.

Since only the direct current terms in the outputs of the chroma demodulators are here of interest, the present discussion may be simplified by assuming that these demodulators are product modulators rather than square-law demodulators.

Accordingly the distorted outputs of the chroma demodulators may be written as $$(R-Y)'=S\cos\ (\omega_s t+\Delta) \qquad (3)$$

and $$(B-Y)'=S\cos\left(\omega_s t+\Delta-\frac{\pi}{2}\right) \qquad (4)$$

Substituting Equation 2 into Equation 3 provides $$(R-Y)'=[(R-Y)\cos \omega_s t]\,[\cos\ (\omega_s t+\Delta)] + \left[(B-Y)\cos\left(\omega_s t-\frac{\pi}{2}\right)\right][\cos\ (\omega_s t+\Delta)] \qquad (5)$$

If factors in Equation 5 are multiplied it is found that the result contains second-harmonic terms which are easily eliminated by a low-pass filter, and a factor of one-half which may be neglected.

Accordingly the Equation 5 may be resolved as $$(R-Y)'=(R-Y)\cos \Delta-(B-Y)\sin \Delta \qquad (6)$$

which may, in turn, be rewritten as $$(R-Y)'=\cos \Delta[(R-Y)-(B-Y)\tan \Delta] \qquad (7)$$

This indicates that the above mentioned error $\Delta$ produces in the $R-Y$ component a reduced amplitude of $\cos \Delta$ and a crosstalk error term of $-(B-Y)\tan \Delta \cos \Delta$. Substitution of Equation 2 into Equation 4 and application of the same process as the one involved in the Equations 5 to 7 shows that the distorted $B-Y$ component may be written as $$(B-Y)'=\cos \Delta[(B-Y)+(R-Y)\tan \Delta] \qquad (8)$$

Equation 8 includes the same reduced amplitude $\cos \Delta$ Equation 7. In contrast to Equation 7, however, the error term, namely $(R-Y)\tan \Delta \cos \Delta$, has a positive sign because of the phase angle of $-\pi/2$ in Equation 4. Accordingly the Equations 7 and 8 indicate a case of non-reciprocal coupling in which the error term in either chroma signal includes a component of the other chroma signal, and in which the error term in either signal is of a polarity opposite to the polarity of the error term in the other signal.

The apparatus illustrated in the drawing is capable of eliminating or at least materially attenuating these error terms. The hue control apparatus 10 of FIG. 1 includes first and second input terminal means 11 and 12 which, respectively, receive the distorted first chroma signal $(R-Y)'$ and the distorted second chroma signal $(B-Y)'$.

In practice, the terminal means 11 and 12 may be connected to a video tape playback apparatus so as to receive the reproduced demodulated color-difference signals. For instance, the terminal means 11 and 12 may, respectively, be connected to the $R-Y$ and $B-Y$ discriminators 72 and 74 shown in FIG. 1 of my above mentioned copending patent application. However, it should also be understood that the terminal means 11 and 12 may be instance be connected to two chroma channels of a closed-circuit television system.

A first negative-gain or inverting amplifier 14 is connected to the input terminal means 11 to receive the $(R-Y)'$ signal, and a second negative-gain amplifier 15 is connected to the input terminal means 12 to receive the $(B-Y)'$ signal. A series-connected resistor 16 and potentiometer 17 are connected between the input terminal means 11 and the output of the amplifier 14, while a series-connected resistor 18 and potentiometer 19 are connected to the input terminal means 12 and the output of the amplifier 15.

A first adding network 20, schematically shown as including adding resistors 21 and 22, has one of its inputs connected to the input terminal means 11 so as to receive the distorted $(R-Y)'$ signal, and the other of its inputs connected to the sliding arm 24 of the potentiometer 19 so as to receive an error signal which is combined with the $(R-Y)'$ signal to produce a corrected signal $K(R-Y)$ at the output terminal 26 of the apparatus 10.

Similarly, a second adding network 28, schematically shown as including adding resistors 29 and 30, has one of its inputs connected to the input terminal means 12 so as to receive the distorted $(B-Y)'$ signal, and the other of its inputs connected to the sliding arm 32 of the potentiometer 17 so as to receive an error signal which is combined with the $(B-Y)'$ signal to produce a corrected signal $K(B-Y)$ at the output terminal 33 of the apparatus 10.

In the preferred embodiment shown in the drawing, the sliding arms 24 and 32 of the two potentiometers 19 and 17 are ganged as indicated by a phantom line 35, so as to permit hue corrections in both chroma channels by adjustment of a single control knob 36. The travel of each of the sliding arms 24 and 32 is indicated in the drawing by $x$ which is a scalar varying from zero to one as the potentiometer arms move from their lowermost to their uppermost positions.

The resistance values of the two resistors 16 and 18 are equal and may be designated as $R_1$. Similarly, the resistance values of the two potentiometers 17 and 19 are equal and may be designated as $R_2$.

To provide for a correction of both positive or negative hue error excursions, the gain of each of the amplifiers 14 and 15 and the ratio of $R_1$ and $R_2$ with respect to the resistors 16 and 17 and the resistors 18 and 19 have to be carefully selected.

According to a preferred embodiment of the subject invention, each of the amplifiers 14 and 15 is constructed to have a negative gain of $$\alpha = -\tan \Delta_{max} \quad (9)$$

wherein $\Delta_{max}$ is the maximum excursion of the angular hue error to be corrected. Moreover, the above mentioned resistance ratio is selected to be $$\frac{R_1}{R_2} = \frac{1-\tan \Delta_{max.}}{2 \tan \Delta_{max.}} \quad (10)$$

which for the purpose of the following equations can also be written as $$\frac{R_2}{R_1+R_2} = \frac{2 \tan \Delta_{max.}}{1+\tan \Delta_{max.}} \quad (11)$$

The output voltage $v_{out}$ of the potentiometer 17 between the sliding arm 32 and ground can be expressed as $$v_{out} = xR_2I_1 - (R-Y)' \tan \Delta_{max} \quad (12)$$

wherein $I_1$ is the current through the resistors $R_1$ and $R_2$ and $-(R-Y)' \tan \Delta_{max}$ is the output of the amplifier 14, as is apparent from the Equation 9.

The current $I_1$ is arrived at when it is considered that $(R-Y)'$ from the input terminal means 11 and the output of amplifier 14 act in series across the resistors 16 and 17, so that $$I_1 = (R-Y)' \frac{1+\tan \Delta_{max}}{R_1+R_2} \quad (13)$$

Substituting the latter into the Equation 12 gives $$v_{out} = (R-Y)' \left[ \times \frac{R_2}{R_1+R_2} (1+\tan \Delta_{max}) - \tan \Delta_{max} \right] \quad (14)$$

Substituting 11 into 14 gives $$v_{out} = (R-Y)'[2\times \tan \Delta_{max} - \tan \Delta_{max}] \quad (15)$$

or $$v_{out} = (R-Y)' \tan \Delta_{max}(2x-1) \quad (16)$$

If $x=0$, the output of the potentiometer 17 is $$v_{out0} = -(R-Y)' \tan \Delta_{max} \quad (17)$$

Substituting Equation 7 into Equation 17 we find that $$v_{out0} = -\tan \Delta_{max} \cos \Delta[(R-Y)-(B-Y) \tan \Delta] \quad (18)$$

or $$v_{out0} = -\tan \Delta_{max} \cos \Delta(R-Y) + \tan \Delta_{max} \cos \Delta \tan \Delta(B-Y) \quad (19)$$

The second term in the Equation 19 can be neglected, since the product of the tangents of two relatively small angles is much smaller than the tangent and cosine product in the first term of the Equation 19.

As to the first term in Equation 19, it is seen that it corresponds numerically to the second term of $\cos \Delta(R-Y) \tan \Delta$ in Equation 8 if the latter angle $\Delta$ is equal to $\Delta_{max}$. However, these two terms are of opposite sign.

Accordingly, the output derived from the potentiometer arm 32 when $x=0$ will, through the combination network 28, eliminate the maximum positive-going excursion of the error term of the signal $(B-Y)'$ applied to the input terminal means 12 of the apparatus 10 of FIG. 1. The output at the terminal means 33 is then $$\cos \Delta\ (B-Y) \quad (20)$$

which can be written as $$K(B-Y) \quad (21)$$

The factor K, which stands for $\cos \Delta$, can generally be equated to unity, as the value of the cosine of small angles is close to one. In color video applications it is also to be considered that the factor K represents a saturation error, while the human eye is more sensitive to hue errors, which are corrected according to the invention, then to color saturation errors.

If $x=1$, the output at the potentiometer arm 32, according to Equation 16 becomes $$v_{out1} = +(R-Y)' \tan \Delta_{max} \quad (22)$$

so that the maximum negative-going hue error term in $(B-Y)'$ is corrected.

The correction of the hue error term in the $(R-Y)'$ signal by the output at the potentiometer arm 24 proceeds in accordance with the same principles, except that the variable resistance of the potentiometer 19 is expressed as $$R_2(1-x) \quad (23)$$

so that the above Equation 16, when applied to the $(B-Y)'$ signal, becomes $$v_{out}' = (B-Y)' \tan \Delta_{max}(1-2x) \quad (24)$$

wherein $v_{out}'$ is the output voltage between the potentiometer arm 24 and ground.

When $x=0$, $v_{out}'$ is $$v_{out}' = +(B-Y)' \tan \Delta_{max} \quad (25)$$

Substituting Equation 8 into Equation 25, we find that $$v_{out0}' = \tan \Delta_{max} \cos \Delta(B-Y) + \tan \Delta_{max} \cos \Delta \tan \Delta(R-Y) \quad (26)$$

The second term of Equation 26 can be neglected for the reasons given above under the Equation 19 and we obtain, for $x=0$, $$v_{out0}' = \tan \Delta_{max} \cos \Delta(B-Y) \quad (27)$$

In the apparatus 10, this latter voltage is applied to the adding network 20 where it eliminates the maximum excursion ($\Delta_{max}$) of the hue error term $-\cos \Delta(B-Y) \tan \Delta$ of the $(R-Y)'$ signal represented in the above Equation 7. The output at the terminal means 26 then becomes $$\cos \Delta(R-Y) \quad (28)$$

or $$K(R-Y) \quad (29)$$

If $x=1$, the output voltage at the potentiometer arm 24 becomes, pursuant to Equation 24, $$v_{out1}' = -(B-Y)' \tan \Delta_{max} \quad (30)$$

which shows that positive-going excursions of the hue error term in the $(R-Y)'$ signal can also be corrected by adjustment of the potentiometer 19.

Another interesting and practically significant fact is that the principles of the illustrated preferred embodiment of the invention permit the potentiometers 17 and 19 to be ganged and adjusted together by means of one knob or similar element 36. In this manner, a single control effects simultaneous hue adjusmtents in both color channels.

If $x=0.5$, that is if both potentiometers are in their mid-position, no hue error correction takes place, as can be seen from the Equations 16 and 24.

The chroma signal outputs from the terminal means 26 and 33 may be matrixed in a conventional manner to produce the $G-Y$ (green minus luminance) signal, whereupon the $R-Y$, $G-Y$ and $B-Y$ signals may be applied to grid driving amplifiers of a tricolor video display tube. Alternatively, the matrixing of the outputs of terminal means 26 and 33 may be carried out with the participation of the Y or luminance signal to provide the R, G and B primary color signals for subsequent display.

If a hue error is apparent to the viewer of the displayed color scene, he effects a correction by turning the control knob 36 of the apparatus 10. Starting with the position of $x=0.5$, corrections of positive and of negative-going hue errors may gradually be effected under the principles outlined above.

In this manner, video tape recordings which would otherwise be useless because of recorded hue errors can be successfully played back.

As has been indicated above, many cases arise in which the hue fidelity of the chroma signals is not impaired from a theoretical point of view, but in which factors such as personal viewing preferences, particular characteristics of the color display device or lighting conditions at the viewing location may nevertheless dictate hue adjustments.

Considering the principles so far discussed, it is clear that hue control operations of the latter type may also be affected by adjustments of the ganged potentiometers 17 and 19 of the apparatus 10.

This apparatus is thus a means for controlling the hue information content of chroma signals both in the sense of providing for a correction of hue errors and in the sense of adjusting theoretically correct hue information to practically desired values. While the principles of the apparatus illustrated in the drawing have been explained above on the basis of color-difference signals, it should be understood that these principles are also applicable to other types of chroma intelligence, such as the familiar I (in-phase) and Q (quadrature) color signals.

I claim:

1. Apparatus for adjusting the hue intelligence of two electric chroma signals, comprising:

(a) first means for receiving a first one of said chroma signals;

(b) second means for receiving the second one of said signals;

(c) third means connected to said first means for producing a first control signal having a value of $$S_1 \tan \Delta_{max}(2x-1)$$

wherein $S_1$ is the amplitude of said first chroma signal, $\Delta_{max}$ is a predetermined angle, and $x$ is a scalar adjustable from zero to one;

(d) fourth means connected to said second means for producing a second control signal having a value of $$S_2 \tan \Delta_{max}(1-2x)$$

wherein $S_2$ is the amplitude of said second chroma signal, $\Delta_{max}$ is substantially said predetermined angle, and $x$ is a scalar adjustable from zero to one;

(e) fifth means connected to said first means and said fourth means for combining said first chroma signal and said second control signal; and (f) sixth means connected to said second means and said third means for combining said second chroma signal and said first control signal.

2. Apparatus as claimed in claim 1, including means connected to said third means and to said fourth means for simultaneously adjusting said scalar $x$ in said first control signal and said scalar $x$ in said second control signal.

3. Apparatus as claimed in claim 1, wherein:

(a) said third means include first amplifier means connected to said first means and having substantially a gain of $$-\tan \Delta_{max}$$

wherein $\Delta_{max}$ is said predetermined angle; and (b) said fourth means include second amplifier means connected to said second means and having substantially a gain of $$-\tan \Delta_{max}$$

wherein $\Delta_{max}$ is said predetermined angle.

4. Apparatus as claimed in claim 3, wherein:

(a) said third means further include first and second impedance means connected in series between said first means and said first amplifier means, with the impedance ratio of said first impedance means to said second impedance means being substantially $$\frac{1-\tan \Delta_{max}.}{2 \tan \Delta_{max}.}$$

wherein $\Delta_{max}$ is said predetermined angle; and (b) said fourth means further include third and fourth impedance means connected in series between said second means and said second amplifier means, with the impedance ratio of said third impedance means to said fourth impedance means being substantially $$\frac{1-\tan \Delta_{max}.}{2 \tan \Delta_{max}.}$$

wherein $\Delta_{max}$ is said predetermined angle.

5. Apparatus as claimed in claim 4, wherein:

(a) said second impedance means is a first potentiometer having a sliding arm; and (b) said second impedance means is a second potentiometer having a sliding arm ganged with said sliding arm of said first potentiometer.

6. Apparatus as claimed in claim 1, wherein:

(a) said fifth means are constructed to subtract said second control signal from said first chroma signal; and (b) said sixth means are constructed to subtract said first control signal from said second chroma signal.

7. Apparatus as claimed in claim 1, wherein said predetermined angle is equal to a maximum excursion of an angular hue error contained in said chroma signals.

References Cited

UNITED STATES PATENTS 3,170,991 2/1965 Glasgal -------------- 179—1

RICHARD MURRAY, Primary Examiner

J. C. MARTIN, Assistant Examiner